United States Patent [19]

Casey

[11] 4,315,559
[45] Feb. 16, 1982

[54] MUFFLER FOR INTERNAL COMBUSTION ENGINE

[76] Inventor: Russell A. Casey, 1010 E. Thompson St., Sapulpa, Okla. 74066

[21] Appl. No.: 131,746

[22] Filed: Mar. 19, 1980

Related U.S. Application Data

[63] Continuation-in-part of Ser. No. 862,102, Dec. 9, 1977, abandoned.

[51] Int. Cl.³ .......................... F01N 1/08; F01N 3/04
[52] U.S. Cl. ..................................... 181/265; 181/229; 181/231; 181/261; 181/268; 181/272; 55/276; 123/25 E; 123/568
[58] Field of Search ............... 181/231, 264, 265, 267, 181/269, 279–281, 270, 275, 229, 211, 260, 261, 237, 268, 272; 55/276; 123/25 E, 25 F, 568, 570

[56] References Cited

U.S. PATENT DOCUMENTS

| | | | |
|---|---|---|---|
| 1,866,004 | 7/1932 | Beamer | 181/265 |
| 2,354,179 | 7/1944 | Blanc | 181/260 |
| 2,640,557 | 6/1953 | Gaffney | 181/265 |
| 3,361,227 | 1/1968 | Kauko Kaari | 181/265 |
| 3,498,406 | 3/1970 | Heath | 181/265 |
| 3,786,896 | 1/1974 | Foster et al. | 181/265 |

Primary Examiner—Joseph W. Hartary
Assistant Examiner—Benjamin R. Fuller
Attorney, Agent, or Firm—Head & Johnson

[57] ABSTRACT

A muffler for internal combustion engines and comprising a housing having an inlet passageway for admitting exhaust gases into the interior of the housing and an outlet passageway for discharging the exhaust gases from the housing, the interior of the housing providing a fluid passageway having a cross-sectional area greater than the cross-sectional area of the inlet and outlet passageways for reducing back pressure as the gases move through the muffler, baffles disposed within the housing and in the fluid passageway for providing a tortuous path of travel for the gases moving between the inlet and outlet passageways to increase the length of the travel of the gases through the muffler and to provide alcoves or pockets in the interior of the housing for cushioning the flow of the gases therethrough in order to equalize the pressure within the muffler, and a passageway providing communication between the interior of the housing and the combustion chamber of the engine for directing a portion of the hot exhaust gases back into the combustion chamber for burning of residual fuel contained in the exhaust gases to increase the fuel efficiency of the engine.

9 Claims, 5 Drawing Figures

TOP VIEW

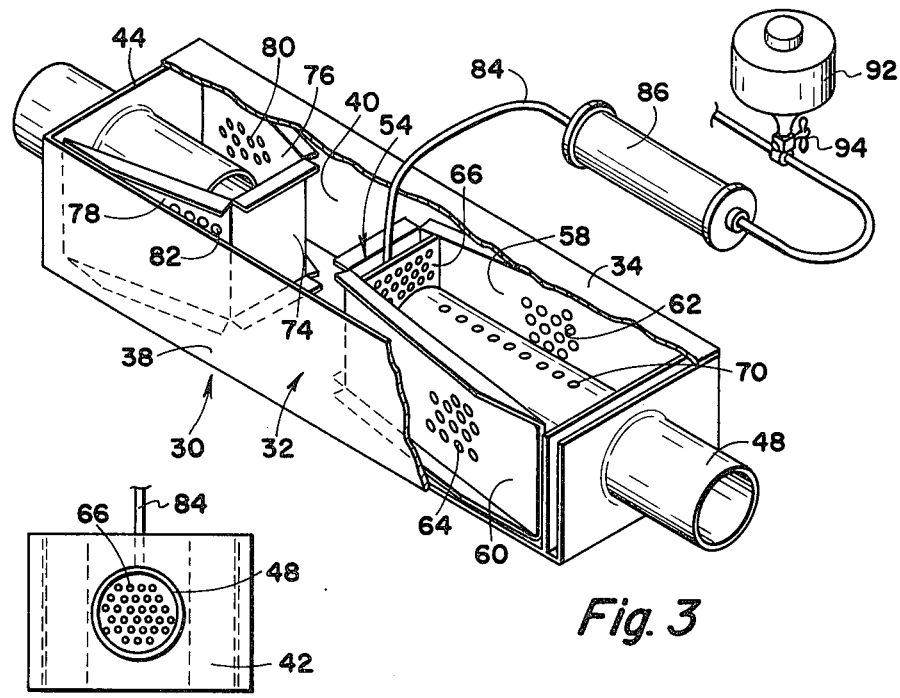
Fig. 3
Fig. 5
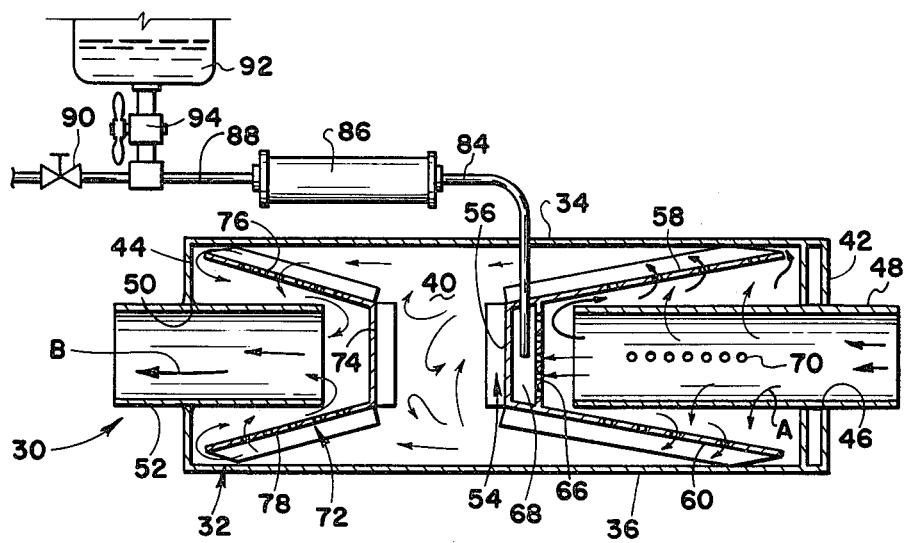
Fig. 4

MUFFLER FOR INTERNAL COMBUSTION ENGINE

CROSS-REFERENCE TO RELATED APPLICATIONS

This application is a continuation-in-part of my copending application Ser. No. 862,102, filed Dec. 19, 1977, and entitled "Muffler for Internal Combustion Engines", now abandon.

BACKGROUND OF THE INVENTION

1. Field of the Invention

This invention relates to improvements in mufflers for internal combustion engines and more particularly, but not by way of limitation, to a muffler having means for reducing back pressure and increasing the efficiency of the operation of the muffler.

2. Description of the Prior Art

Many of the conventional mufflers available today for use in conjunction with an internal combustion engine direct the exhaust gases from the engine through a plurality of small openings or ports which frequently become clogged with rust, carbon, and the like, during use of the muffler. It will be apparent that this clogging of the ports reduces the efficiency of the operation of the muffler. For example, the inefficiency of the muffler operation frequently creates back pressure in the engine, which reduces upper cylinder lubrication, and reduces the horse power of the engine. In addition, the conventional mufflers in use today do not adequately muffle the sound of the engine exhaust which is objectionable, particularly in the light of the present day noise pollution controls.

SUMMARY OF THE INVENTION

The present invention contemplates a novel muffler for internal combustion engines which has been particularly designed and constructed for overcoming the foregoing disadvantages. The novel muffler comprises a housing or casing having an inlet conduit extending therein for admitting the exhaust gases from the engine into the interior of the housing, and an outlet cnduit for discharge of the exhaust gases therefrom. The housing provides a passageway for the gases which is of a greater cross-sectional area than the cross-sectional area of either the inlet conduit or outlet conduit, thus relieving or substantially precluding the creation any back pressure during operation of the muffler. In addition, baffle means is secured within the housing and interposed between the inlet and outlet conduits to provide a tortuous path of travel for the gases moving through the muffler, said path of travel having the effect of substantially reversing the direction of at multiple positions within the housing gas flowing between the inlet and outlet conduits, thus providing a greatly increased distance through which the gases travel prior to the discharge thereon into the atmosphere. The design of the path of travel for the gases also creates alcoves or pockets within the housing wherein a circular, turbent or swirling action is created for portions of the gas flow stream, thus cushioning the flow of the gas and equalizing the pressure within the muffler. Furthermore, a portion of the hot exhaust gases maybe directed back into the carburetor of the engine whereby residual fuel remaining in the exhaust gas may be recirculated for burning. Thus, the fuel efficiency of the engine is greatly increased, with a resultant reduction in air pollution at the discharge outlet of the muffler. The novel muffler is simple and efficient in operation and economical and durable in construction.

BRIEF DESCRIPTION OF THE DRAWINGS

FIG. 3 is a perspective view of a modified muffler embodying the invention.

FIG. 4 is a sectional elevational view, partly in section, of the modified muffler shown in FIG. 3.

FIG. 5 is a view taken on line 5—5 of FIG. 4.

DESCRIPTION OF THE PREFERRED EMBODIMENTS

Figure 1:
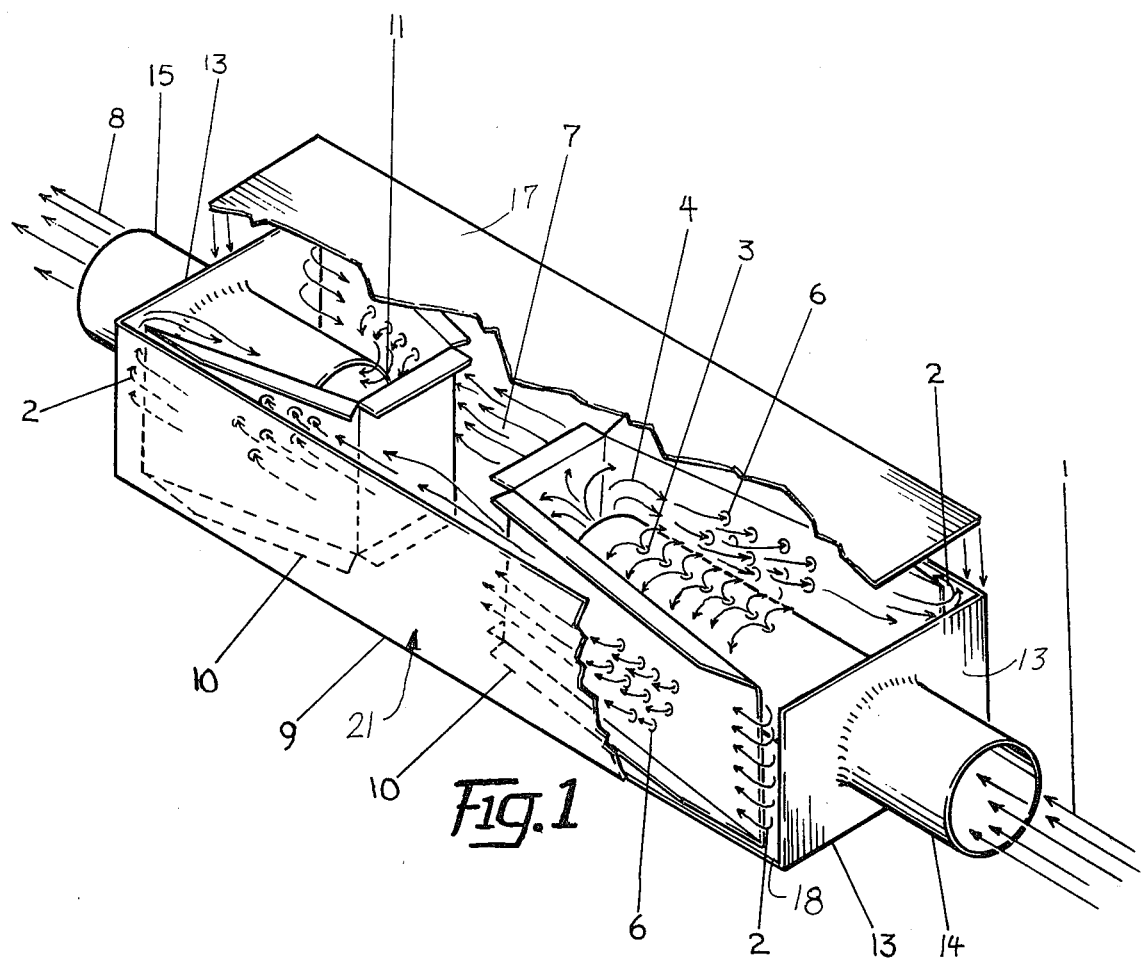
FIG. 1 is a prespective view of a muffler embodying the invention, with portions cut away for purposes of illustration.
Figure 2:
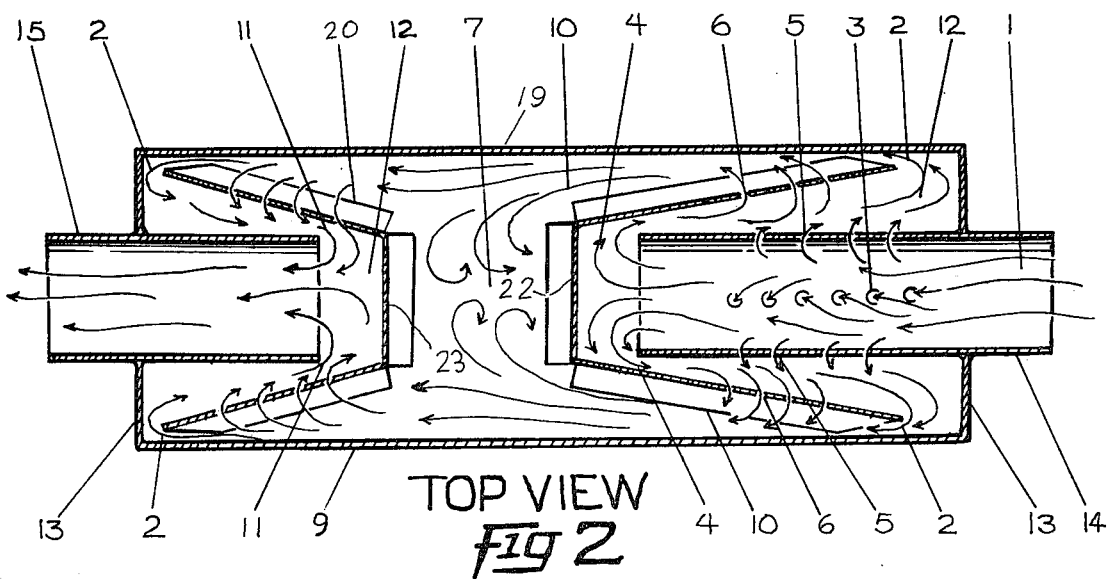
FIG. 2 is a sectional elevational view of a muffler embodying the invention.

Referring to the drawings in detail, and particularly FIGS. 1 and 2, reference character 21 indicates a hollow metal casing having a top 17, a bottom 18, and oppositely disposed side walls 9 and 19. An inlet pipe 14 is mounted on one end of the casing 21 and an outlet pipe 15 is mounted on the other end of the casing 21. End plates 13 are secured to the opposite ends of the housing 21 and the inlet and outlet pipes 14 and 15, respectively, extend through the end plates and are preferably welded thereto. The inlet and outlet pipes extend toward the center of the muffler casing 21 a substantial distance, and will be seen in the drawings. For the purpose of description, exhaust gases 1 from any suitable internal combustion engine (not shown) enter at the inlet pipe 14 and come into contact with a baffle element 10 which has a closed end in the casing 21 and spaced slightly from the inner end of the inlet pipe 14.

From the baffle 10 the flow of gases continues through passageways 2, 3, 5 and 6 and toward the outward direction through a baffle 20, and through the outlet pipe 15 where the gases are expelled from the muffler. The angularly disposed baffle 10 extends inwardly from the inlet end of the metal casing 21, and is welded to the top 17 and to the bottom 18 of the metal casing 21. The baffle element 20 extends inwardly from the outlet end and is welded to the top 17 and to the bottom 18 of the metal casing 21. The baffle elements 10 and 20 are perforated to release the flow of gases at high speeds of the engine and thus eliminates the build up of pressure within the baffle elements. Baffles 22 and 23 are non-perforated for the purpose of quieting the sound of the exhaust gases passing through the muffler. The positioning of baffle elements 10 and 20 define a passageway that is substantially larger than the cross-sectional area of either the inlet pipe 14 or the outlet pipe 15, and thereby provides initial expansion of the gases for enhancing the flow of said gases through the muffler.

As the gases pass through the muffler of FIG. 2, in the path generally designated by the arrows 16 a plurality of alcoves or pockets 12, 4 and 7 are created adjacent the baffle elements in which air currents and gas currents are trapped and which are energized and pressurized by the flow of gases through the muffler. The gases in the alcoves 12, 4 and 7 contain the cooler and heavier gases because of the centrifugal force created by the bases being directed in the plurality of substantially 180°, or reverse direction turns by use of the baffle elements. The gases in the alcoves 12, 4 and 7 rotate in the manner illustrated by the curved arrows in said alcoves 12, 4 and 7, and thus lubricates and enhances the flow of gases through the muffler. It will be readily apparent that the plurality of angularly disposed baffle elements cause in the gases passing through the muffler to travel a considerable distance in relation to the length of the muffler, thus further enhancing the flow of the gases therethrough.

Referring now to FIGS. 3, 4 and 5, a modified muffler generally indicated at 30 is shown which is similar to that hereinbefore set forth in detail, and comprises a housing or casing 32 having upper and lower walls 34 and 36, respectively, spaced apart by oppositely disposed sidewalls 38 and 40. The opposite ends of the housing 32 are closed by end walls 42 and 44. A central bore 46 is provided in the end wall 42 for receiving an inlet conduit 48 therethrough, and a central bore 50 is provided in the end wall 44 for receiving an outlet conduit 52 therethrough. The inlet conduit 48 is preferably welded or otherwise secured to the end wall 42 and extends longitudinally into the interior of the housing 32 a substantial distance, as clearly shown in the drawings. The outlet conduit 52 is similarly welded or otherwise secured to the end wall 44 and extends into the interior of the housing 32.

A first baffle assembly 54 is secured within the housing 32 in any suitable manner, such as by welding thereof to the inner periphery of the housing, and comprises an imperforate plate 56, spaced inwardly from the inner end of the inlet conduit 48 and having a pair of oppositely disposed outwardly diverging side plates 58 and 60 extending therefrom in a direction toward the end plate 42. The plates 58 and 60 are provided with a plurality of spaced ports 62 and 64, respectively, and in addition, a perforated plate 66 is secured between the inner ends of the angular plates 58 and 60, and is spaced slightly inboard of the plate 56 to provide a chamber 68 therebetween.

The inner end of the inlet conduit 48 is substantially centrally disposed between the angular walls 58 and 60, and a plurality of longitudinally and circumferentially spaced ports 70 are provided in the pipe 48 providing communication between the interior of the conduit 48 and the interior of the housing 32 whereby a portion of the incoming exhaust gases moving through the conduit 48 passes into the housing 32 between the angular walls 58 and 60, as shown by the arrows A in FIG. 4. An additional portion of the exhaust gas flows out the inner end of the conduit 48 and moves through the perforate plate 66 into the chamber 68. A still additional portion of the gas moves into engagement with the angular walls 58 and 60 and is substantially reversed in the direction of travel for moving along the inner face of the walls 58 and 60 for discharge into the housing 32 through the ports 62 and 64.

A second baffle assembly generally indicated at 72 is secured within the housing 32 in a similar manner as the baffle assembly 54, and comprises an imperforate plate 74 spaced inwardly from the inner end of the outlet conduit 52 and having a pair of outwardly diverting sidewalls 76 and 78 extending therefrom in a direction toward the end plate 44. The walls 76 and 78 are provided with a plurality of spaced ports 80 and 82, respectively. The exhaust gases which enter the housing 32 from the baffle assembly 54 move in a direction toward the baffle assembly 72, and flow through the ports 80 and 82 and around the outer end of the angular walls 76 and 78, where the direction of travel of the gas flow is again substantially reversed, whereupon the gases are directed to the outlet conduit 52 for discharge from the housing 32 as shown by the arrows B. As the gas stream moves from the baffle assembly 54 toward the baffle assembly 72, a portion of the gas will accumulate in the housing 32 between the imperforate plates 56 and 74 whereupon a swirling action will occur for providing a cushioning of the movement of the gas stream through the muffler, thus equalizing the pressure in the housing 32, as set forth in connection with the first embodiment of the invention.

A pipe 84 having one end open to the chamber 68 extends through the open upper end of the chamber 68 as clearly shown in FIG. 3 and through one wall of the housing 32, such as the wall 34, and into communication with one end of a suitable filter 86. The filter 86 is preferably a charcoal filter, but not limited thereto. A second pipe 88 extends from the opposite end of the filter 86 to the carburetor (not shown) of the internal combustion engine (not shown). A suitable check valve 90, or the like, is preferably interposed in the line or pipe 88 for precluding a back flow of fluid through the pipe 88, and a suitable water source 92 is preferably in communication with the interior of the line 88 through a suitable valve 94 whereby water may be selectively introduced into the line 88 during operation of the muffler 30.

As hereinbefore set forth, a portion of the hot exhaust gases entering the housing 32 through the inlet conduit 48 are captured in the chamber 68, and these hot gases are communicating to the carburetor through the filter 86 and valve 90 whereby any residual fuel in the exhaust gases may be burned. The water admitted into the flow stream being directed back into the carburetor will be vaporized by the heat of the exhaust gases, and thus will not warp the engine valves (not shown).

By way of summary, during operation of the muffler 30, exhaust gases enter the housing 32 through the inlet conduit 48 where a portion of the flow stream is directed in a tortuous or substantially reversing path of travel as it moves in a direction toward the outlet conduit 50. This movement of the flow stream prevents an accumulation of rust or other foreign particles within the housing 32 by carrying such particles out the conduit 50 for discharge into the atmosphere. In addition, a portion of the hot gases will be directed back into the carburetor for burning of any residual fuel which was exhausted from the carburetor without a complete burning. Thus, the engine efficiency is enhanced.

From the foregoing it will be apparent that the present invention provides a novel muffler for an internal combustion engine which moves the exhaust gases through a reversing path of travel which extends the distance through which the gases move prior to discharge from the muffler. In addition, alcoves or pockets are provided in the muffler for cushioning the movement of the gases therethrough to equalize the pressure within the muffler and substantially preclude back pressure from muffler inefficiency. A portion of any unburned fuel remaining in the exhaust gases may be returned to the carburetor for a reburning operation, thus greatly increasing the engine fuel efficiency.

Whereas the present invention has been described in particular relation to the drawings attached hereto, it should be understood that other and further modifications, apart from those shown or suggested herein may be made within the spirit and scope of this invention.

What is claimed is:

1. A muffler for an internal combustion engine and comprising a closed housing, inlet conduit means extending through a first end of the housing for introducing exhaust gases from the engine into the housing, outlet conduit means extending through a second end of the housing for discharge of the exhaust gases from the housing, first baffle means secured within the housing and having an imperforate plate spaced inboard of the inner end of the inlet conduit means for deflecting the flow of the exhaust gases entering the housing, outwardly diverging angular plate means extending from the imperforate plate in a direction toward the said first end of the housing for creating a reversing direction of movement for the exhaust gases within the housing and providing alcove means within the housing for equalization of the pressure therein, second baffle means secured within the housing and having an imperforate plate disposed in spaced relation with respect to the inner end of the outlet conduit, outwardly diverging plate means secured to the imperforate plate and extending in a direction toward the second end of the housing for cooperation with the first diverging plate means to provide additional reversing direction of movement for the exhaust gases prior to discharge thereof from the outlet conduit means.

2. A muffler as set forth in claim 1 wherein the inlet conduit means is provided with a plurality of spaced ports for directing a portion of the exhaust gases against the inner surface of the first diverging plate means.

3. A muffler as set forth in claim 2 wherein the first and second diverging plate means are provided with a plurality of spaced ports for enhancing the travel of the exhaust gases between the inlet conduit means and outlet conduit means.

4. A muffler as set forth in claim 1 wherein the cross-sectional area of the interior of the housing is greater than the cross-sectional area of the inlet and outlet conduit means for permitting an expansion of the exhaust gases entering the housing during operation of the muffler.

5. A muffler as set forth in claim 1 and including a perforated plate member secured between the first diverging plate means and spaced from the imperforate plate for providing a chamber therein to receive a portion of the exhaust gases therein, and means adapted for communication between the said chamber and the engine for recirculating said portion of the exhaust gas for burning any residual fuel contained therein.

6. A muffler as set forth in claim 5 wherein the last mentioned means comprises pipe means having one end open to the said chamber, and the opposite end adapted for communication with a carburetor of the engine.

7. A muffler as set forth in claim 6 and including filter means interposed in the pipe means for receiving the said portion of exhaust gases therethrough prior to return of the exhaust gases to the carburetor.

8. A muffler as set forth in claim 7 and including check valve means interposed in the pipe means for precluding back flow of the exhaust gases through the pipe means.

9. A muffler as set forth in claim 7 and including water supply means in communication with interior of the pipe means for selective injection of water into the exhaust gases moving therethrough.

* * * * *